Nov. 3, 1970 SUSUMU NAGANO 3,537,940

TAPE SPLICER

Filed April 2, 1969 4 Sheets-Sheet 1

INVENTOR

SUSUMU NAGANO

BY Stevens, Davis, Miller & Mosher

ATTORNEYS

Nov. 3, 1970 SUSUMU NAGANO 3,537,940

TAPE SPLICER

Filed April 2, 1969 4 Sheets-Sheet 2

INVENTOR

SUSUMU NAGANO

BY Stevens, Davis, Miller & Mosher

ATTORNEYS

INVENTOR
SUSUMU NAGANO

BY Stevens, Davis, Miller & Mosher

ATTORNEYS

INVENTOR
SUSUMU NAGANO
BY Stevens, Davis, Miller & Mosher
ATTORNEYS

United States Patent Office 3,537,940
Patented Nov. 3, 1970

3,537,940
TAPE SPLICER

Susumu Nagano, Yokosuka, Japan, assignor to Victor Company of Japan Limited, Yokohama, Japan Filed Apr. 2, 1969, Ser. No. 812,588
Claims priority, application Japan, Apr. 8, 1968, 43/22,879
Int. Cl. B31f *5/00;* G03d *15/04;* B65h *19/00*
U.S. Cl. 156—505 15 Claims

ABSTRACT OF THE DISCLOSURE

A tape splicer which permits to carry out in one operation cutting of magnetic tape, attaching of splicing tape to both ends of the magnetic tape, and shaping of the splice in effecting splicing of the magnetic tape particularly in producing endless magnetic tape. The tape splicer comprises tape guide base provided with a cutter plate mounted on a base plate near one end thereof, a frame pivotally mounted at one end thereof on said base plate near the other end thereof in spacer apart relationship with said tape guide base so that the other end of said frame can be moved between an upper position, and a lower position, a cutter blade for cutting the magnetic tape shaping blade means for shaping the splicers which are mounted in said frame and adapted to be moved by suitable sliding means into a position corresponding to the position of said cutter plate, and feed means for supplying a desired length of splicing tape in conjunction with said suitable sliding means.

The present invention relates to tape splicers in general. In particular, the invention deals with a tape splicer of the type which facilitates uniting of two ends of magnetic tape together in producing endless magnetic tape for tape cartridges used with magnetic tape recorders of the tape cartridge type.

In general, a tape cartridge used with a magnetic tape recorder of the tape cartridge type has endless magnetic tape built thereinto. In producing the endless magnetic tape, it is required to join together two ends of magnetic tape that has been cut into a predetermined length.

In one method of splicing magnetic tape known in the art, two ends of magnetic tape is overlapped one over the other and held in a hand, and the overlapped portion is cut obliquely by a tool, for example a nipper. The two obliquely cut ends of the magnetic tape are butted together without overlap on the tape guide plate provided with a guide groove of a width similar to the width of the magnetic tape, and a length of special bonding tape or splicing tape is attached to butted end portions of the magnetic tape. After a length of aluminum tape for switching channels or sensing tape is attached to a portion of the magnetic tape in the neighborhood of the splice, the magnetic tape is removed from the tape guide plate and the excess material of the splicing tape is severed by scissors or the like.

The splicing technique of the prior art just described has disadventages in that it involves many steps and the splices formed are not uniform in quality.

The present invention obviates these disadvantages of the prior art and makes it possible to effect in one operation cutting of magnetic tape, attaching of splicing tape, and shaping of splice of the magnetic tape in producing endless magnetic tape.

Accordingly, a primary object of this invention is to provide a tape splicer which permits to positively carry out uniting together of two ends of magnetic tape by simple means in producing endless magnetic tape.

Another object of the invention is to provide a tape splicer which permits to carry out uniting together of two ends of magnetic tape in a very short interval of time.

Further object of the invention is to provide a tape splicer which makes it possible to effect in one operation cutting of tape, attaching of splicing tape, and shaping of splice of the magnetic tape in splicing magnetic tape.

Still another object of the invention is to provide a tape splicer which makes it possible to effect in one operation cutting of the magnetic tape by a cutter blade and attaching of splicing tape to two ends of the magnetic tape and shaping of the splice in conjunction with the movement of shaping blade means which is mounted in space apart relationship with said cutter blade.

Still further object of the invention is to provide a tape splicer which permits to produce endless magnetic tape of uniform quality.

The other objects as well as features and advantages of the invention will become apparent from consideration of the description set forth hereinafter when considered in conjunction with the accompanying drawings, in which.

Figure 1:
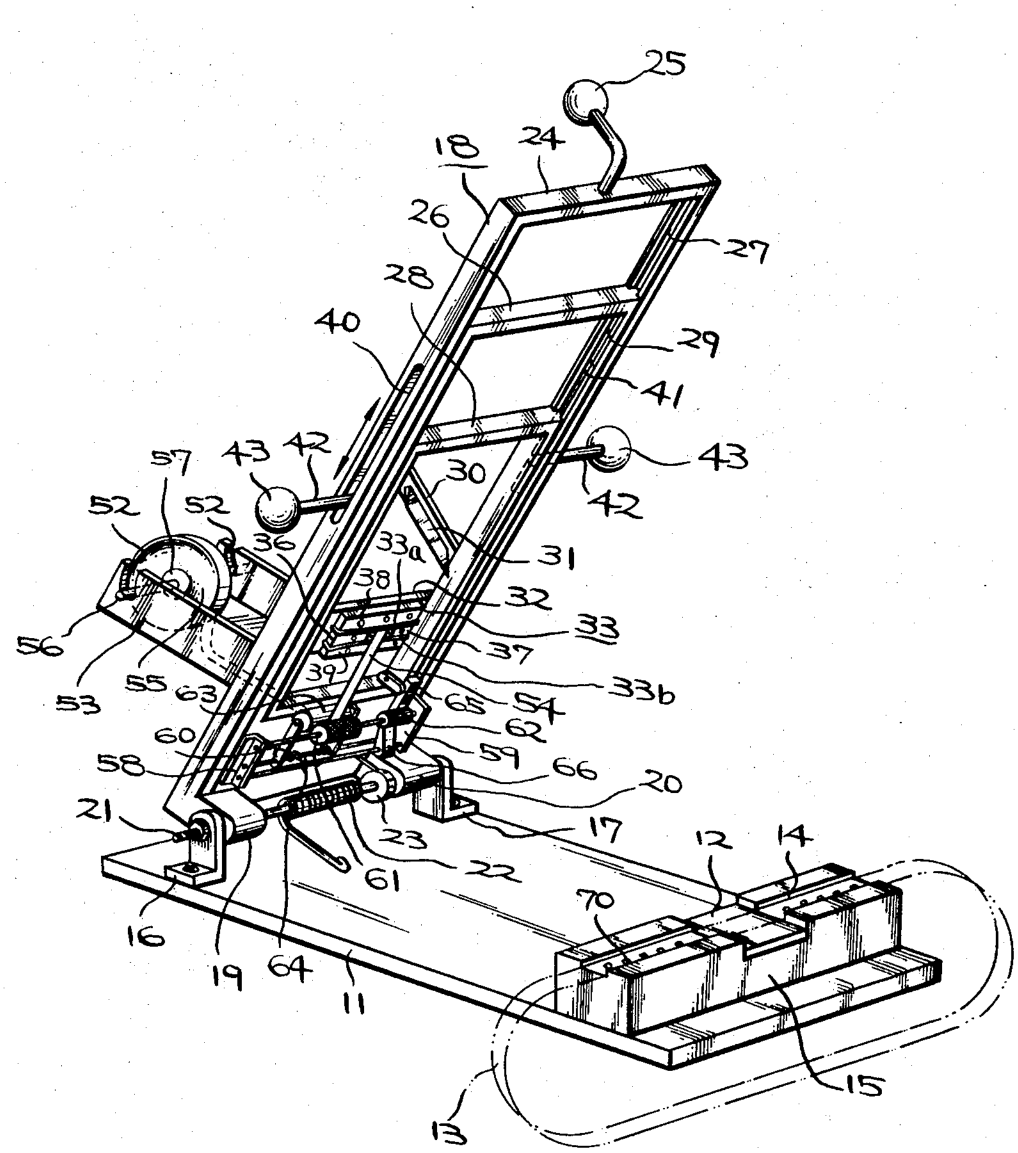
FIG. 1 is a perspective view of one embodiment of the tape splicer according to this invention.

The invention will now be explained with reference to one embodiment shown in FIGS. 1 to 5, in which a tape guide base 15 is disposed on a base plate 11 near one end thereof. The tape guide base 15 comprises a cutter plate 12 disposed in the center, and end portions disposed on opposite sides of the cutter plate and formed with a guide groove 14 of the same width as magnetic tape 13. The cutter plate 12 is, for example, an aluminum plate (1.3 to 1.4 millimeters in thickness) of proper hardness and exact flatness having a coat of acetate resin thereon. A pair of brackets 16 and 17 are disposed on the base plate 11 near the other end thereof, and a shaft 21 extends through openings formed in said brackets for pivotally supporting a frame 18 at its base portions 19 and 20. The free end of the frame 18 which is freely movable between an upper position and a lower position is normally maintained in the upper position by the biasing force of a spring 22 mounted on the shaft 21. The biasing force of the spring 22 can be adjusted by a spring adjusting wheel 23 firmly fixed to the shaft 21.

A handle 25 is attached to a free end portion 24 of the frame 18 which has two rails 27 attached to the inner sides of its longitudinal members for mounting a first inner sliding frame member 26 for longitudinal sliding motion relative to the frame 18. The first inner sliding frame member 26 has two rails 29 attached to the inner sides of its longitudinal members for mounting a second inner sliding frame member 28 for longitudinal sliding motion relative to the frame 18 and the first inner sliding frame member 26.

A cutter blade 31 for cutting magnetic tape and a shaping blade means 33 are mounted on the second inner sliding frame member 28 in spaced apart relationship with one another. The cutter blade 31 is attached to a mounting plate 30 and disposed obliquely at an angle of about 45° with respect to the longitudinal axis of the magnetic tape, and the shaping blade means 33 comprises two blade members 33*a* and 33*b* attached to a mounting plate 32 and disposed parallel to the longitudinal axis of the magnetic tape. The two shaping blade members 33*a* and 33*b* are attached to the mounting plate 32 such that a spacer 34 and a foaming rubber member 35 are disposed between the two shaping blade members, and spacers 36 and 37 are disposed on opposite sides of the spacer 34 and the forming rubber member 35. A keep plate 38 is attached to the top of the shaping blade member 33*a* and a keep plate 39 is attached to the bottom of the shaping blade member 33*b* so as to hold the shaping blade members between said two keep plates.

The longitudinal members of the frame 18 are each formed with a slot 40 therein and the longitudinal members of the first inner sliding frame member 26 are each formed with a slot 41 therein, said slots 41 being in alignment with said slots 40 at their basses when a pair of slide levers 42 are in the lowermost position and having a smaller length. The pair of slide levers 42 are firmly fixed at one end to longitudinal members of the second inner sliding frame member 28 to extend through the slots 40 and 41. A pair of knobs 43 are attached to the slide levers 42 at the other end of the latter.

Figure 2:
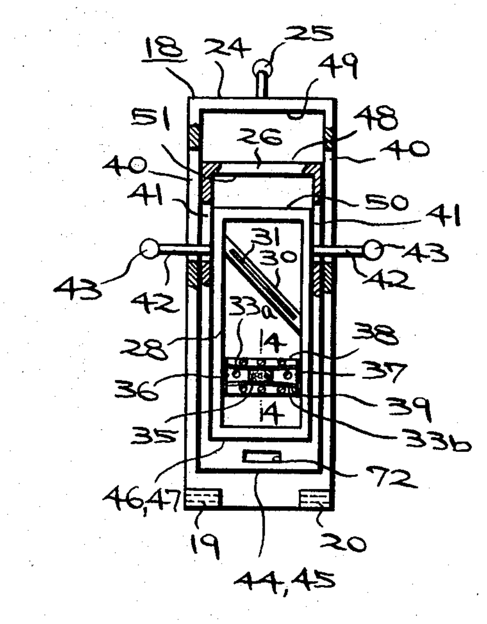
FIGS. 2 and 3 are fragmentary longitudinal sectional bottom plan view of the embodiment shown in FIG. 1, with certain parts being cut out.
Figure 3:
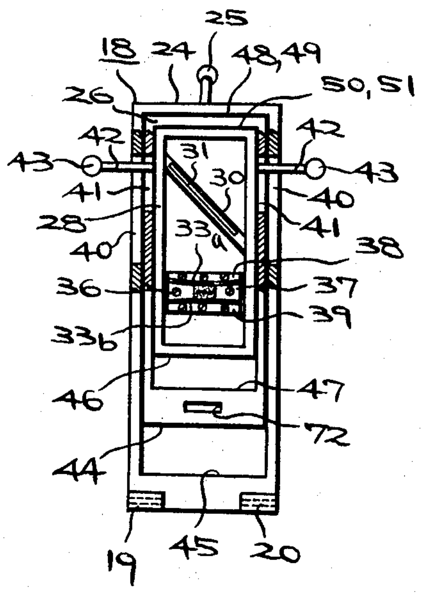

When an outer lower end 44 of the first inner sliding frame member 26 is in engagement with an inner lower end 45 of the frame and an outer lower end 46 of the second inner sliding frame member 28 is in engagement with an inner lower end 47 of the first inner sliding frame member 26 as shown in FIG. 2, the cutter blade 31 is disposed in a position corresponding to the position of the cutter plate 12. When an outer upper end 48 of the first inner sliding frame member 26 is in engagement with an inner upper end 49 of the frame 18 and an outer upper end 50 of the second inner sliding frame member 26 is in engagement with an inner upper end 51 of the first inner sliding frame member 26 as shown in FIG. 3, the shaping blade means 33 is disposed in a position corresponding to the position of the cutter plate 12.

Reel supporting members 53 each formed with a cutout 52 are connected to the longitudinal members of the first inner sliding frame member 26. Splicing tape 55 made as of a synthetic resinous material and having a coat of bonding agent applied to the underside 54 is wound on a reel 57 having a reel shaft 56 extending through the center of the reel and inserted in the cutouts 52 in the reel supporting members 53.

Brackets 58 and 59 are attached to the longitudinal members of the first inner sliding frame member 26 and disposed opposite the reel supporting members 53 with respect to the first inner sliding frame member for rotatably supporting a rotary shaft 60 thereon. The rotary shaft 60 mounts thereon a roller 61 and a gear 62, said roller being adapted for feeding splicing tape and having a knurled outer circumferential surface. A roller 63 is mounted such that it is urged by the biasing force of a spring 64 to press the splicing tape against the feed roller 61 to hold the same between the two rollers. A rack 65 is mounted on the second inner sliding frame member 28 for meshing engagement with the gear 62 only when the second inner sliding frame member 28 is moved upwardly relative to the first inner sliding member 26. 66 is a pawl for preventing rotation of the gear 62 in reverse direction.

Figure 4:
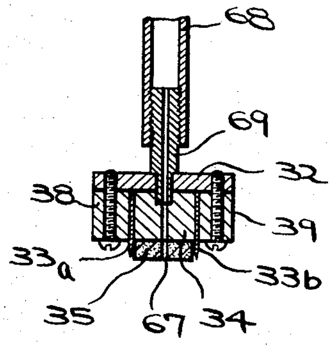
FIG. 4 is a sectional view taken along the line 4—4 of FIG. 2.

A plurality of small openings 67 extending through the spacer 34 and foaming rubber member 35 disposed between the shaping cutter members 33*a* and 33*b* are maintained in communication with a line 68 connected at one end to a receiving member 69 firmly fixed to the mounting plate 32 as shown in FIG. 4. A vacuum pump (not shown) is connected to the other end of the line 68 for drawing the splicing tape by suction and holding the same in a position corresponding to the position of the shaping cutter means 33. A plurality of small openings 70 are formed in the tape guide base 15 and maintained in communication with a line (not shown) at one end of the latter which is connected at the other end to a vacuum pump (not shown) for drawing by suction two end portions of the magnetic tape 13 which are not joined together yet and holding the same in position in the guide groove 14 of the tape guide base 15.

The operation of the embodiment of the present invention which is constructed as aforementioned will now be explained. When it is desired to join together two end portions of the magnetic tape 13 of a predetermined length, the end portions of the magnetic tape 13 of a predetermined length, the end portions of the magnetic tape are placed in the guide groove 14 on the tape guide base 15 and laid one over the other on the cutter plate 12. The overlapped end portions of the magnetic tape are drawn by suction and held in place on the cutter plate. The vacuum means disposed between the pair of blade members 33*a* and 33*b* of the shaping blade means 33 is actuated simultaneously, and the slide levers 42 are moved to the lowermost position in the slots 40 and 41.

Figure 5:
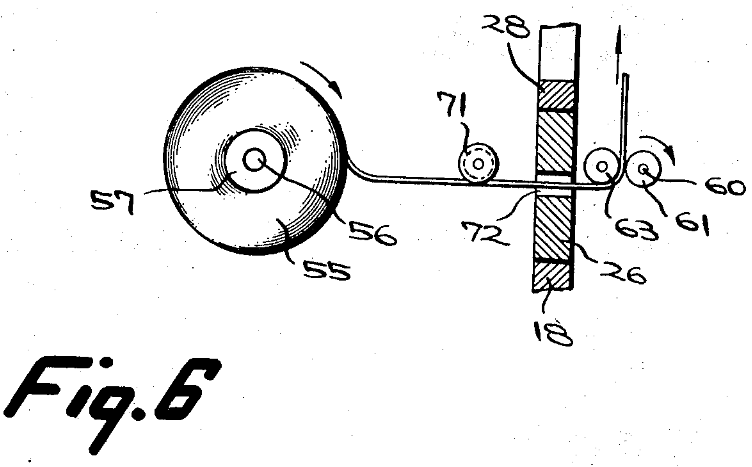
FIG. 5 is a view in explanation of the relation between splicing tape and rollers of the embodiment shown in FIG. 1.
Figure 6:
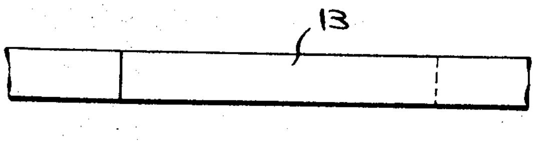
FIGS. 6 to 9 are views in explanation of various steps in the process for splicing magnetic tape.
Figure 7:
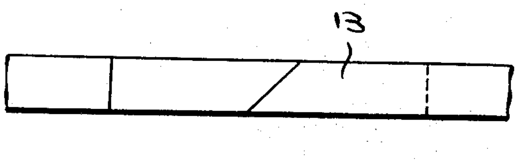
Figure 8:
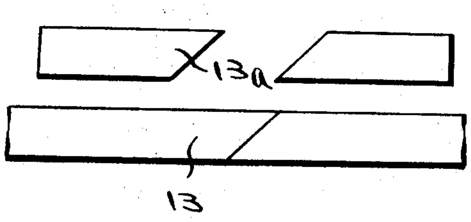

Then, the operation handle 25 is operated by hand to move the free and 24 of the frame 18 downwardly to cut the overlapped end portions of the magnetic tape 13 by the cutter blade 31 as shown in FIG. 7. Then, the free end 24 of the frame 18 is moved upwardly and severed end portions 13*a* are blown away by suitable means as shown in FIG. 8. The slide levers 42 are moved by operating the knobs 43 to the uppermost position in the slots 40 and 41. This brings the shaping blade means 33 into a position corresponding to the position of the cutter plate 12. In the initial stage of the upward movement of the slide levers 42, the first inner slide frame member 26 remains stationary because of the existence of the slots 41 and only the second inner sliding frame member 28 is moved upwardly, so that the rack 65 mounted on the latter is moved upwardly and the gear 62 in meshing engagement therewith is rotated to thereby rotate the feed roller 61. Upon rotation of the feed roller 61, a predetermined length of the splicing tape 5, which is wound on the reel 57 and moved past a guide roller 71 as shown in FIG. 5 and through an opening 72 formed in the lower portion of the first inner sliding frame member 26 as shown in FIGS. 2, 3 and 5 to be held between the rollers 61 and 63, is unwound from the reel and the forward end portion of said predetermined length of splicing tape is positioned against the shaping blade means 33 and drawn thereto by suction.

In the later stage of the upward movement of the slide levers 42, the first and second inner sliding frame members 26 and 28 move as a unit after the outer upper end 50 of the second inner sliding frame member 28 is brought into engagement with the inner upper end 51 of the first inner sliding frame member 28 till the outer upper end 48 of the first inner sliding frame member 48 is brought into engagement with the inner upper end 49 of the frame 18. This prevents further stretching of the length of the splicing tape 55 positioned against the shaping blade means 33, and the length of the splicing tape is displaced as a whole into a position where it is positioned against the cutter plate 12.

Then, the operating handle 25 is operated by hand to move the free end 24 of the frame 18 to its lower position, whereby the forward end portion of the predetermined length of the splicing tape 55 is attached to the end portions of the magnetic tape 13. At the same time, the splicing tape 55 and the magnetic tape is cut by the shaping blade means 33 so that the splice may be shaped. Thereafter, the free end 24 of the frame 18 is moved upwardly again by operating the operating handle 25, the slide levers 42 are moved to the lowermost position by operating the knobs 43, and all the vacuum means are rendered inoperative. This completes the splicing operation of the endless magnetic tape.

When the slide levers 42 are moved downwardly, only the second inner sliding frame member 28 moves downwardly in sliding motion at first, but after the outer lower end 46 of the second inner sliding frame member 28 is brought into engagement with the inner lower end 47 of the first inner sliding frame member 26, the first and second inner sliding frame members 26 and 28 move downwardly as a unit in sliding motion to the lowermost position where they are ready for the next following splicing operations.

The two blade members 33*a* and 33*b* of the shaping blade means 33 may be mounted such that they are curved inwardly. This prevents the end edges of the blade members 33*a* and 33*b* from biting into the magnetic tape 13.

Figure 10:
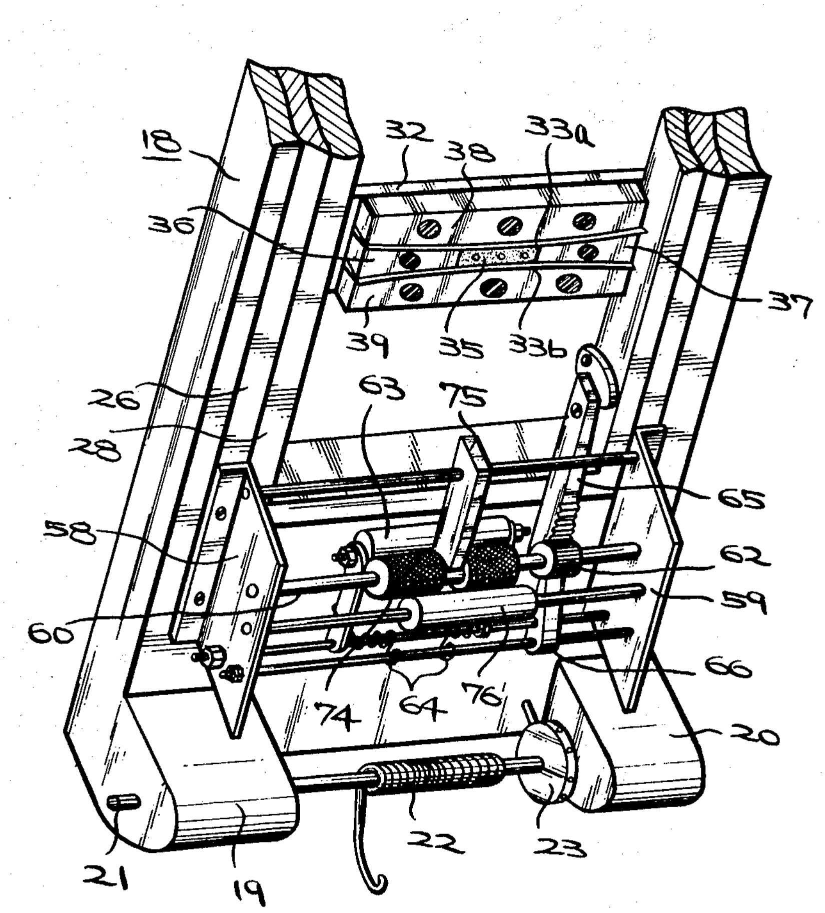
FIG. 10 is a perspective view, with certain parts being cut out, of another embodiment of the tape splicer according to this invention.
Figure 11:
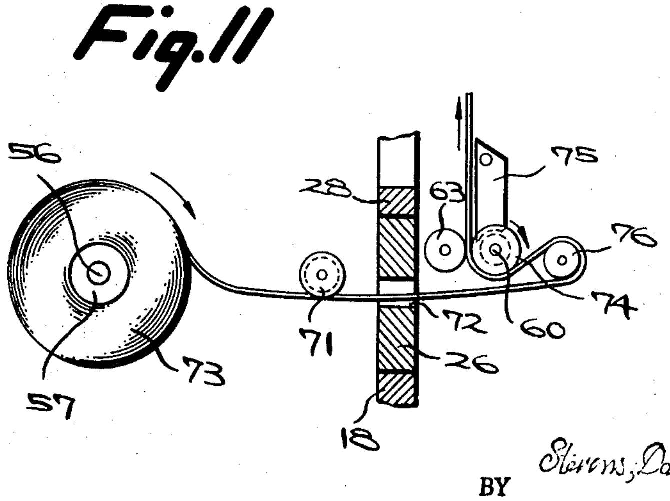
FIG. 11 is a view in explanation of the relation between splicing tape and rollers of the embodiment shown in FIG. 10.

FIGS. 10 and 11 show essential portions of another embodiment of the tape splicer according to this invention. In FIGS. 10 and 11, like reference characters designate parts which are similar to those of the embodiment shown in FIGS. 1 to 5, and explanation of such parts is omitted.

In said another embodiment, splicing tape 73 made of a conducting material, for example aluminum, and serving concurrently as a sensing tape may be used in place of the splicing tape 55 made of a synthetic resinous material. The tape 73 has a coat of bonding agent applied to its underside. The rotary shaft 60 rotatably supported by the brackets 58 and 59 fixed to the first inner sliding frame member 26 mounts thereon a feed roller 74 which is formed such that it has a smaller diameter portion in the center and larger diameter portions on opposite sides of said smaller diameter center portion, said larger diameter portions having knurled outer circumferential surfaces. A stripper 75 is mounted such that it is positioned against the smaller diameter center portion of the feed roller 74 and out of contact with the knurled outer circumferential surfaces of the larger diameter portions. A roller 76 is rotatably mounted on a shaft supported by the brackets 58 and 59 fixed to the first inner sliding frame member 26 in spaced apart relation with the feed rollers 74.

The fact that the splicing tape 73 used in this embodiment is made of a conducting material to serve concurrently as a sensing tape makes it necessary to increase the coefficient of friction of the feed roller 74 and the tape 73 so that the tape 73 may move smoothly as the feed roller 74 is rotated. To attain this end, the tape 73 is passed around the roller 76 before it is passed between the roller 74 and the pressing roller 63. However, the tape passed between the feed roller 74 and the pressing roller 63 in the manner described tends to get adhered to the outer circumferential surfaces of the feed roller 74 so that the tape is deviated from a predetermined path of travel and move with the feed roller in the direction of rotation thereof. In order to prevent this phenomenon and cause the tape 73 to move along the predetermined path of travel, the stripper 75 is provided as set forth above in the predetermined path of travel of the tape 73. The provision of the stripper 75 prevents deviation of the tape 73 from the predetermined path of travel after it is passed between the feed roller 74 and the pressing roller 63, making it possible to effect accurate feeding of the tape 73.

The stripper may be shaped such that its upper end is disposed near the shaping blade 33 along the path of travel of the tape 73. This arrangement eliminates the necessity of drawing the tape by vacuum means for holding the same in position between the two blade members 33*a* and 33*b*. Thus, the use of vacuum means can be obviated.

The tape 73 used in the second embodiment has a larger thickness and higher hardness than the tape 55 used in the first embodiment. Cutting of the tape 73 requires a relatively great force, and consequently the cutter plate 12 readily suffers damage if it is a lacquer board as aforementioned. Accordingly, the cutter plate 12 used in the second embodiment is made of vinyl chloride, polypropylene, polycarbonate or the like. Particularly, relatively hard vinyl chloride best serves this purpose.

Figure 9:
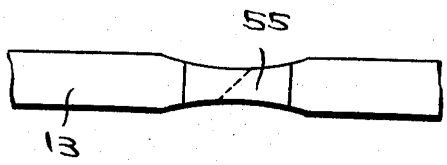

FIGS. 6 to 9 shows in sequence the manner in which splicing of the tape used in the first embodiment is effected. If the reference numeral 55 designating the tape in FIG. 9 is replaced by the reference numeral 73, these figures may also serve to illustrate the splicing procedure of the second embodiment. Therefore, detailed explanation of the splicing procedure of the second embodiment is omitted. It will be evident, however, that if the splicing tape can be used concurrently as a sensing tape for switching the channels, the usefulness of the tape splicer is further increased.

From the foregoing description, it will be appreciated that the tape splicer according to this invention makes it possible to effect cutting of magnetic tape, attaching of splicing tape, and shaping of the splice of the magnetic tape in one operation in effecting splicing of magnetic tape. The present invention offers many industrial advantages in that it permits to shorten operation time by removing mental fatigue of operators during operation, produce products of uniform quality, and greatly increase the yield of the products by reducing the incidence of products unsatisfactory for specifications.

While the present invention has been shown and described with reference to preferred embodiments thereof, it is to be understood that the invention is not limited thereto, and that many modifications and changes may be made therein without departing from the spirit and scope of the invention.

What I claim is:

1. A tape splicer comprising a base plate, a tape guide base formed thereon with a cutter plate and a guide groove for guiding magnetic tape and disposed on said base plate near one end thereof, a frame pivotally mounted at one end thereof on said base plate near the other and thereof in spaced apart relationship with said tape guide base so that the other end of said frame can be moved between an upper position and a lower position, a first inner sliding frame member slidably mounted within said frame, a second inner sliding frame member slidably mounted within said first inner sliding frame member, a cutter blade for cutting magnetic tape mounted obliquely on said second inner sliding frame member with respect to the longitudinal axis of the magnetic tape, shaping blade means comprising a pair of blade members mounted on said second inner sliding frame member in spaced apart relationship with said cutter blade and disposed parallel to the longitudinal axis of the magnetic tape, means for moving said second inner sliding frame member in sliding motion to thereby bring said cutter blade and said shaping blade means into a position corresponding to the position of said cutter plate on said tape guide base, a splicing tape, a pair of rolls for unwinding a length of said splicing tape from said first inner sliding frame member, and means for feeding said splicing tape operated in accordance with a difference in the amount of movement between said first inner sliding frame member and said second inner sliding frame member.

2. A tape splicer as defined in claim 1 in which said shaping blade means comprising a pair of blade members is mounted such that at least one of the blade members is curved inwardly.

3. A tape splicer as defined in claim 1 in which said splicing tape is made of a conducting material.

4. A tape splicer as defined in claim 1 which further comprises vacuum means provided in the bottom of said tape guide groove on said tape guide base for drawing a length of the magnetic tape by suction and holding the same in said tape guide groove, and vacuum means provided between said pair of blade members of said shaping blade means for drawing by suction a length of the splicing tape disposed against said blade members and holding the same in said position.

5. A tape splicer as defined in claim 1 which further comprises means connected to said first inner sliding frame member for supporting a reel on which said splicing tape is wound.

6. A tape splicer as defined in claim 1 which further comprises means for moving a length of said splicing tape held between said pair of rollers only when said second inner sliding frame member is moved relative to said first inner sliding frame member.

7. A tape splicer comprising a base plate, a tape guide base formed thereon with a cutter plate and a guide groove for guiding magnetic tape and disposed on said base plate near one end thereof, a frame pivotally mounted at one end thereof on said base plate near the other end thereof in spaced apart relation with said tape guide base so that the other end of said frame can be moved between an upper position and a lower position, spring means normally urging said the other end of said frame to move to said upper position by its biasing force, a first inner sliding frame member slidably mounted within said frame, a second inner sliding frame member slidably mounted within said first inner sliding frame member, a cutting blade for cutting magnetic tape mounted obliquely on said second inner sliding frame member with respect to the longitudinal axis of the magnetic tape, shaping blade means comprising a pair of blade members mounted on said second inner sliding frame member in spaced apart relationship with said cutter blade and disposed parallel to the longitudinal axis of the magnetic tape, a splicing tape supported by support means connected to said first inner sliding frame member, a rotary shaft rotatably mounted on said first inner sliding frame member, a first roller and a first gear firmly fixed to said rotary shaft, a second roller positioned against said first roller for resiliently pressing a length of said splicing tape against said first roller and maintaining the same between the two rollers, and a rack firmly fixed to said second inner sliding frame member and adapted to be brought into meshing engagement with said gear only when said second inner sliding frame member is moved relative to said first inner sliding frame member.

8. A tape splicer as defined in claim 7 which further comprises a first pair of slots each formed in one of the longitudinal members of said frame, a second pair of slots each formed in one of the longitudinal members of said first inner sliding frame member, and a pair of slide levers each firmly fixed at one end to one of the longitudinal members of said second inner sliding frame member and extending through said first and second pairs of slots, said first pair of slots and said second pair of slots being in alignment with one another at the lower ends when said pair of slide levers are in the lowermost position and said second pair of slots having a smaller length than said first pair of slots.

9. A tape splicer as defined in claim 7 in which said shaping blade means comprising a pair of blade members is mounted such that at least one of the blade members is curved inwardly.

10. A tape splicer as defined in claim 7 in which said splicing tape is made of a conducting material.

11. A tape splicer as defined in claim 7 which further comprises vacuum means provided in the bottom of said tape guide groove on said tape guide base for drawing a length of the magnetic tape by suction and holding the same in said tape guide groove, and vacuum means provided between said pair of blade members of said shaping blade means for drawing by suction a length of the splicing tape disposed against said blade members and holding the same in said position.

12. A tape splicer as defined in claim 7 in which said first roller has a knurled outer circumferential surface.

13. A tape splicer comprising a base plate, a tape guide base formed thereon with a cutter plate and a guide groove for guiding magnetic tape and disposed on said base plate near one end thereof, a frame pivotally mounted at one end thereof on said base plate near the other end thereof in spaced apart relation with said tape guide base so that the other end of said frame can be moved between an upper position and a lower position, spring means normally urging said the other end of said frame to move to said upper position by its biasing force, a first inner sliding frame member slidably mounted within said frame, a second inner sliding frame member slidably mounted within said first inner sliding frame member, a cutter blade obliquely mounted on said second inner sliding frame member for cutting magnetic tape, shaping blade means comprising a pair of blade members mounted parallel to each other on said second inner sliding frame member in spaced apart relationship with said cutter blade, each of said pair of blade members being curved inwardly, spicing tape made of a conducting material and supported by support means connected to said first inner sliding frame member, a rotary shaft rotatably mounted on said first inner sliding frame member, a first roller and a gear mounted on said rotary shaft, said first roller having a smaller diameter portion in the center and larger diameter portions disposed on opposite sides thereof and having knurled outer circumferential surfaces, a stripper positioned against said smaller diameter center portion of said first roller, a second roller positioned against said first roller for resiliently pressing a length of said splicing tape against said first roller and maintaining the same between the two rollers, a third roller rotatably mounted opposite said second roller with respect to said first roller so that said length of said splicing tape may travel about said third roller, and a rack firmly fixed to said second inner sliding frame member and adapted to be brought into meshing engagement with said gear only when said second inner sliding frame member is moved relative to said first inner sliding frame member.

14. A tape splicer as defined in claim 13 which further comprises a first pair of slots each formed in one of the longitudinal members of said frame, a second pair of slots each formed in one of the longitudinal members of said first inner sliding frame member, and a pair of slide levers each firmly fixed at one end to one of the longitudinal members of said second inner sliding frame member and extending through said first and second pairs of slots, said first pair of slots and said second pair of slots being in alignment with one another at their lower ends when said pair of slide levers are in the lowermost position and said second pair of slots having a smaller length than said first pair of slots.

15. A tape splicer as defined in claim 13 which further comprises vacuum means provided in the bottom of said tape guide groove on said tape guide base for drawing a length of the magnetic tape by suction and holding the same in said tape guide groove.

References Cited

UNITED STATES PATENTS 3,346,437 10/1967 Post et al. ---------- 156—505

BENJAMIN A. BORCHELT, Primary Examiner

D. A. HART, Assistant Hart

U.S. Cl. X.R.

156—502, 506